United States Patent [19]

Miyazaki

[11] 4,393,749

[45] Jul. 19, 1983

[54] VACUUM ACTUATED TYPE BOOSTER DEVICE

[75] Inventor: Yoshihisa Miyazaki, Ueda, Japan

[73] Assignee: Nissin Kogyo Kabushiki Kaisha, Ueda, Japan

[21] Appl. No.: 191,354

[22] Filed: Sep. 26, 1980

[30] Foreign Application Priority Data

Sep. 27, 1979 [JP] Japan .................. 54-124636

[51] Int. Cl.$^3$ .............. F15B 9/10; F01B 19/00; F16J 3/00
[52] U.S. Cl. .................. 91/376 R; 91/369 A; 92/86; 92/98 D; 92/99; 92/248
[58] Field of Search ............ 92/103 R, 99, 98 R, 92/98 D, 103 SD, 103 M, 103 F, 100, 104, 86, 78; 91/369 A, 369 B, 369 R, 376 R; 137/312

[56] References Cited

U.S. PATENT DOCUMENTS

| | | | |
|---|---|---|---|
| 1,885,851 | 11/1932 | Mckee | 92/103 R |
| 3,263,618 | 8/1966 | Carpenter | 92/86 |
| 3,933,950 | 1/1976 | Cuttitta et al. | 92/86 |
| 4,292,887 | 10/1981 | Ohta et al. | 92/98 D |

*Primary Examiner*—Paul E. Maslousky

*Attorney, Agent, or Firm*—Armstrong, Nikaido, Marmelstein & Kubovcik

[57] ABSTRACT

A vacuum actuated type booster device for assisting master cylinder of automobile braking system. The device has a booster shell, a booster piston reciprocatably received by the booster shell, a diaphragm connected at the inner peripheral portion thereof to the rear side of a disc portion of the booster piston and at the outer peripheral portion thereof to the peripheral wall of the booster shell, a first and a second working chambers defined in the booster shell by the booster piston and diaphragm, a vacuum source with which the first and the second working chambers are normally communicated and an input rod slidably mounted in the booster piston. The second working chamber solely is brought into communication with the atmosphere as the input rod is moved forwardly so that the booster piston is driven forwardly by the pressure differential between the first and the second working chambers. The booster piston is constituted by a piston body with windows formed in the disc portion thereof and a porous thin-walled member covering the windows. The diaphragm contacts the porous thin-walled member to close the windows.

5 Claims, 4 Drawing Figures

VACUUM ACTUATED TYPE BOOSTER DEVICE

BACKGROUND OF THE INVENTION

Field of the Invention

The present invention relates to a vacuum actuated type booster device adapted mainly for assisting the master cylinder of automobile braking system by the action of vacuum. More particularly, the invention is concerned with an improvement in the vacuum actuated type booster device of a type having a booster shell, a booster piston reciprocatably received by the booster shell, a diaphragm attached at its inner peripheral portion to the rear side of a radially extending disc portion of the booster piston and at its outer peripheral portion to the peripheral wall of the booster shell, a first and a second working chambers defined in the booster shell by the booster piston and the diaphragm, a vacuum source with which the working chambers are communicated and an input rod sidably provided in the booster piston, wherein as the input rod is moved ahead, the second working chamber solely is brought into communication with the atmosphere to impart a forward driving force to the booster piston by the differential pressure acting on the latter.

In the booster device of this type heretofore proposed, the booster piston is formed integrally from an aluminum alloy or the like material. This booster piston has a considerably heavy weight which occupies a comparatively large part of the whole device. The reduction of the weight of booster piston, therefore, contributes greatly to the reduction of the weight of the device as a whole. It is, however, extremely difficult and almost practically impossible to reduce the weight of the booster piston without incurring the degradation of function of the same. In addition, since the booster piston is formed as a unit, the air which has happened to be trapped between the booster piston and the diaphragm cannot escape to the outside so that the durability of the diaphragm is deteriorated and the operation characteristic of the booster piston is adversely affected because the pressure differential between both working chambers is inconveniently absorbed by the trapped air.

SUMMARY OF THE INVENTION

Under these circumstances, the present invention aims at its major object at providing an improved vacuum actuated type booster device having a booster piston which has a reduced weight and which permits an easy discharge of air trapped between itself and the diaphragm.

To this end, according to the invention, there is provided a vacuum actuated type booster of the type described before, characterized in that the booster piston is composed of a piston body having a disc with an window, and a porous thin-walled member covering the window, the porous thin-walled member being contacted by the diaphragm so that the window is closed.

The above and other objects, as well as advantageous features of the invention will become clear from the following description of the preferred embodiments taken in conjunction with the accompanying drawings.

DESCRIPTION OF THE PREFERRED EMBODIMENTS

Figure 1:
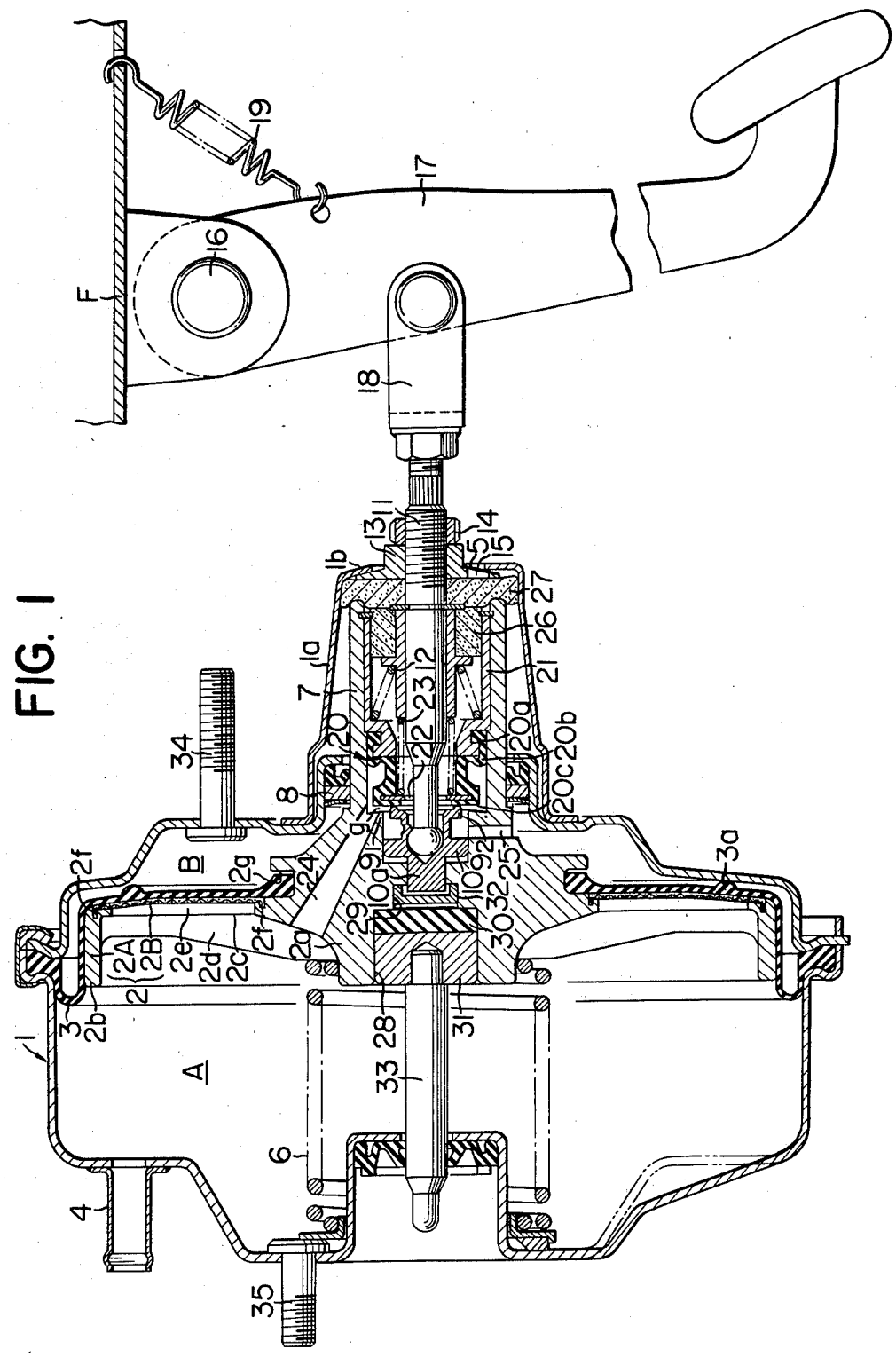
FIG. 1 is a longitudinal sectional side view of a vacuum actuated type booster device constructed in accordance with an embodiment of the invention.
Figure 2:
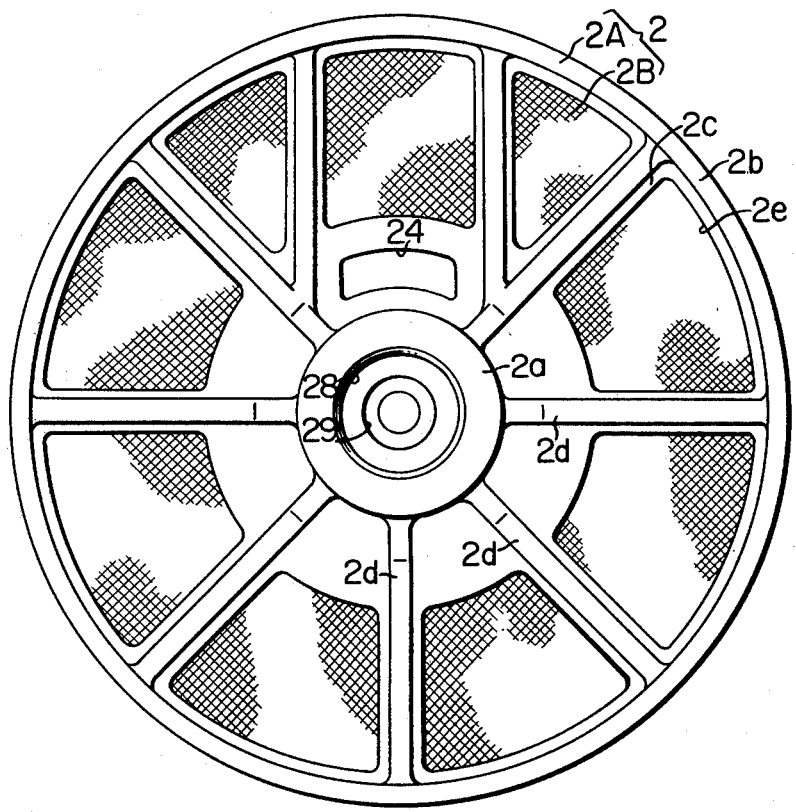
FIG. 2 is a plan view of the booster piston incorporated in the booster device of the invention.

Referring first to FIG. 1, a booster shell 1 reciprocatably receives a booster piston 2 which includes, as shown in FIG. 2, a piston body 2A constituted by a central boss 2a, outer peripheral rim 2b and a disc portion 2c through which the central boss 2a and the peripheral rim 2b are connected unitarily to each other. The disc portion 2c is provided at its front side with a plurality of radial ribs 2d,2d . . . protruding therefrom. A plurality of windows 2e,2e . . . are formed between adjacent ribs 2d,2d . . . Each window 2e is covered by a porous thin-walled member such as a metal screen or gauze wire 2B. The booster piston 2 is thus constructed.

The piston body 2A is formed integrally from a material such as aluminum alloy 2A, plastic resin or the like material. The porous thin-walled member 2B has a bent peripheral portion 2f embedded in the piston body 2A and is attached so as to be continuous from the rear surface of the piston body 2A, so that the rear side of the disc portion 2c is sufficiently smoothed while maintaining a sufficiently high bonding strength of the porous thin-walled member 2B.

Figure 3:
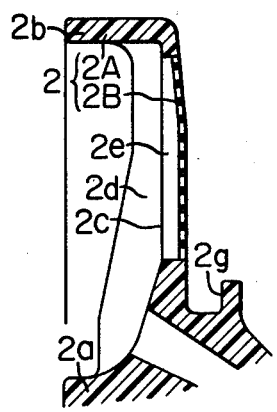
FIGS. 3 and 4 are longitudinal sectional views of modifications of the booster piston.
Figure 4:
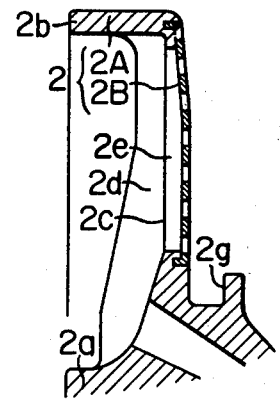

FIGS. 3 and 4 show modifications of the booster piston. More specifically, in the booster piston shown in FIG. 3, the piston body 2A and the porous thin-walled member 2B are formed integrally with each other from a plastic, whereas, in the booster piston shown in FIG. 4, a punched sheet metal is used as the material of the porous thin-walled member 2B. Other parts than specifically mentioned above are all identical to those of the embodiment shown in FIGS. 1 and 2 and are designated at the same reference numerals.

As will be seen from FIG. 1, a diaphragm 3 is superposed to the rear side of the disc portion 2c of the piston body 2A so as to close the windows 2e,2e . . . The diaphragm 3 is fitted at its inner peripheral portion to a peripheral annular groove 2g of the boss 2a, while the outer peripheral portion of the diaphragm 3 is fixed to the peripheral wall of the booster shell 1 to divide the space in the latter into a front first working chamber A and a rear second working chamber B. The first working chamber A is communicated through a vacuum pipe 4 projected forwardly of the booster piston 2 to the intake manifold (not shown) of an engine as the vacuum source, so as to always store the vacuum. An extended sleeve 1a is formed unitarily on the rear surface of the booster shell 1 in the end wall 1b of which formed is an atmospheric port 5.

The booster piston 2 is normally biased in the retracting direction, i.e. toward the second working chamber B, by a reset spring 6 which is accommodated in a compressed state by the first working chamber A. The retracting stroke of the booster piston 2 is limited by an annular rib 3a formed on the backside of the diaphragm 2 and adapted to make a contact with the rear side wall of the booster shell 1.

The booster piston 2 is provided with a valve cylinder 7 formed on the central rear surface thereof and extending in the axial direction therefrom. The valve cylinder 7 is slidably supported by a plane bearing 8 provided in the extension sleeve 1a and is opened at its rear end to the atmospheric port 5. An annular first valve seat $9_1$ is formed on the inner peripheral wall of the valve cylinder 7.

A valve piston 10 connected to an input rod 11 and constituting the front end portion of the latter is slidably received by the front portion of the value cylinder 7. An annular second valve seat $9_2$ surrounded by the first valve seat $9_1$ is formed on the rear end of the piston 10.

The input rod 11 is normally biased in the retracting direction by a reset spring 12. The retracting stroke of the input rod 11 is limited by a movable stopper plate 13 screwed to the input rod 11 and adapted to contact the inside of the end wall 1b. As the stopper plate 13 is rotated, the relative position between the input rod 11 and the stopper plate 13 is changed to permit the adjustment of the retracting stroke end of the input rod 11. After the adjustment, the stopper plate 13 is locked by means of a lock nut 14 screwed to the input rod 11. The movable stopper plate 13 is provided with a ventilation port 15 so as not to close the atmospheric port 5.

A brake pedal 17 pivotally supported by the frame F of automobile is connected to the rear end of the input rod 11 through the medium of a suitable adjustable connecting member 18. A return spring connected to the brake pedal 17 acts to reset the latter rearwardly.

A cylindrical valve member 20 opened at both ends has a base portion 20a secured to the inner peripheral surface of the valve cylinder 7 through the medium of a valve member holding sleeve 21 fitted to the valve cylinder 7. This valve member 20 is made of rubber or the like elastic materal and has the base portion 20a from which radially inwardly extended is a thin-walled diaphragm 20b provided at its inner peripheral end with a thick-walled valve portion 20c so as to oppose to the first and the second valve seats $9_1,9_2$. The valve portion 20c is movable back and forth by the deflection of the diaphragm 20b and can contact the front end surface of the valve member holding sleeve 21.

An annular reinforcement plate 22 is embedded in the valve portion 20c. A valve spring 23 acts on the reinforcement plate 22 so as to bias the valve portion 20c toward the valve seats $9_1,9_2$.

The outer part of the first valve seat $9_1$ makes a continuous communication with the first working chamber A through a communication port 24 of the booster piston 2, while the intermediate portion between the first and the second valve seats $9_1,9_2$ is in continuous communication with the second working chamber B through another communication port 25. Finally, the inside of the second valve seat $9_2$ is in continuous communication with the atmospheric port 5 through the inside of the valve member 20.

The valve cylinder 7 is provided at its outer open end with filters 26,27 for filtrating the air introduced through the atmospheric port 5 but not hindering the operation of the input rod 11.

The booster piston 2 is provided at its front central portion with a hole 28 of a large diameter and a small hole 29 which opens to the inner bottom portion of the latter. The large-diameter hole 28 receives an elastic piston 30 made of a rubber or the like elastic material and an output piston 31 of the same diameter as the elastic piston, such that the elastic piston is located at the inside of the output piston. The small-diameter hole 29 slidably receives a reaction piston 32 of a diameter smaller than that of the elastic piston 30. A small shaft 10a projecting from the front end surface of the valve piston 10 extends into the small-diameter hole 29 so as to oppose to the rear end surface of the reaction piston 32.

The output piston 31 has an output rod 33 which slidably extends through the front wall of the booster shell 1. This output rod 33 is adapted to forwardly driving the piston of a brake master cylinder which is known per se.

A reference numeral 34 designates a bolt for securing the booster shell 1 to the automobile frame F, while a reference numeral 35 designates a bolt by means of which the cylinder body of the brake master cylinder is secured to the front side of the booster shell 1.

The booster device of this embodiment operates in a manner explained hereinbelow.

In the inoperative state of the booster device shown in FIG. 1, the valve piston 10, input rod 11 and brake pedal 17 are reset to the retracting stroke end where the movable stopper plate 13 contacts the stationary end wall 1b, by the forces of the reset springs 12 and 19. The valve piston 10 presses the front side of the valve portion 20c through the second valve seat $9_2$ to bias the latter rearwardly to bring the same into slight contact with the valve member holding sleeve 21, so that a slight gap ga is formed between the first valve seat $9_1$ and the valve portion 20c. This state can easily be created by the suitable adjustment of the movable stopper plate 13.

In the described condition of the booster device, the first working chamber always storing the vacuum is communicated with the second working chamber B through the communication port 24, gap g and the communication port 25, while the front end opening of the valve portion 20c is closed by the second valve seat $9_2$, so that the vacuum is transmitted from the first working chamber A to the second working chamber B to establish a state of equilibrium of force across the booster piston 2. In consequence, the booster piston 2 takes the illustrated retracted position by the action of the reset spring 6.

As the brake pedal 17 is depressed for braking the automobile, the input rod 11 and, hence, the valve piston 10 are moved ahead. In consequence, the valve portion 20c which is forwardly biased by the valve spring 23 is moved forwardly following up the movement of the valve piston 10. However, since the gap g between the first valve seat $9_1$ and the valve portion 20c is small as mentioned before, the valve portion 20c is soon seated on the first valve seat $9_1$ to interrupt the communication between the working chambers A and B. Simultaneously, the second valve seat $9_2$ is moved away from the valve portion 20c to permit the second working chamber B to communicate with the interior of the valve body 20 and, accordingly, with the atmosphere port 5, through the communication port 25.

In consequence, air is introduced without delay into the second working chamber B so that the pressure in the latter becomes higher than that in the first working chamber A. In consequence, the booster piston 2 is moved forwardly overcoming the force of the reset spring 6, due to the pressure differential between two working chambers A and B, so that the elastic piston 30 and the output piston 31 act to move the output rod 33 ahead. As a result, the brake master cylinder (not shown) operates to brake the automobile.

If air has been trapped between the disc portion 2c of the booster piston 2 and the diaphragm 3, this air is sucked into the first working chamber A through the porous thin-walled member 2B so that the diaphragm 3 is made to closely contact the rear side of the booster piston 2 to transmit the pressure differential between both working chambers A and B to the booster piston 2 without fail.

On the other hand, the small shaft 10a of the valve piston 10 comes by the reaction into contact with the elastic piston 30 through the medium of the reaction piston 32. As a result, the elastic piston 30 swells toward the reaction piston 32 due to the reaction of the output rod 33, so that a part of the reactional force is fed back to the brake pedal 17 through the valve piston 10. As a result, the driver can be aware of the output of the output rod 33, i.e. the braking power.

As has been described, according to the invention, the booster piston is constituted by a piston body having a disc portion with windows, and a porous thin-walled member covering the windows and the windows are closed by a diaphragm contacting the porous thin-walled member. Therefore, the weight of the booster piston can be reduced sufficiently while preserving the function of the booster piston which is to act upon receipt of the pressure differential between the first and second working chambers through the medium of the diaphragm, thereby to greatly contributes to the reduction of weight and simplification of construction of the booster device as a whole as well as to the reduction of cost of the same. In addition, the inconvenience caused by the air trapped between the disc portion of the booster piston and the diaphragm is overcome because such air is easily discharged to the first working chamber through the porous thin-walled member.

What is claimed is:

1. In a vacuum actuated booster device having a booster shell, a booster piston reciprocatably received in the booster shell, a diaphragm connected at its inner peripheral portion to the rear side of a radial disc portion of said booster piston and at its outer peripheral portion to the peripheral wall of said booster shell, a first working chamber and a second working chamber defined in said booster shell by said booster piston and said diaphragm, a vacuum source with which said first and second working chambers are normally communicated, an input rod slideably mounted in said booster piston, and valve means connected to atmosphere for bringing said second working chamber into communication with ambient air by the forward movement of said input rod so that said booster piston is driven forwardly by the differential pressure between said first and second working chambers, an improvement wherein said booster piston comprises a piston body having a disc portion with windows and porous thin-walled members covering said windows, said diaphragm contacting said porous thin-walled members closing said windows.

2. A vacuum actuated type booster device as claimed in claim 1, wherein said piston body and said porous thin-walled members are formed integrally from plastic resin.

3. A vacuum actuated type booster device as claimed in claim 1, wherein said porous thin-walled members comprises screen members.

4. A vacuum actuated type booster device as claimed in claim 1, wherein said porous thin-walled members comprises punched sheets.

5. In a vacuum actuated booster device having a booster shell, a booster piston reciprocatably received by said booster shell, a diaphragm connected at its inner peripheral portion to the rear side of a radial disc portion of said booster piston and at its outer peripheral portion to the peripheral wall of said booster shell, a first working chamber and a second working chamber defined in said booster shell by said booster piston and said diaphragm, a vacuum source with which said first and second working chambers are normally communicated, an input rod slideably mounted in said booster piston, and valve means connected to atmosphere for bringing said second working chamber into communication with ambient air by the forward movement of said input rod so that said booster piston is driven forwardly by the differential pressure between said first and second working chambers, an improvement wherein said booster piston comprises a central boss portion, an outer peripheral rim portion and a disc portion integrally interconnecting said boss portion and rim portion, said boss portion, rim portion and disc portion in combination forming a piston body, said disc portion being provided on its front surface with a plurality of radial protrusions and a plurality of windows between adjacent, protrusions, said windows being covered by porous thin-walled members which in turn are contacted by said diaphragm so that said windows are closed by said diaphragm.

* * * * *